(12) United States Patent
Uehara et al.

(10) Patent No.: US 9,046,179 B2
(45) Date of Patent: Jun. 2, 2015

(54) AXIAL SEAL STRUCTURE AND ROTATION MECHANISM PROVIDED WITH SAME

(75) Inventors: Hidekazu Uehara, Tokyo (JP); Tanehiro Shinohara, Tokyo (JP); Takashi Nakano, Tokyo (JP); Shin Nishimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 201 days.

(21) Appl. No.: 13/700,220

(22) PCT Filed: Jun. 23, 2011

(86) PCT No.: PCT/JP2011/064391
§ 371 (c)(1),
(2), (4) Date: Nov. 27, 2012

(87) PCT Pub. No.: WO2011/162330
PCT Pub. Date: Dec. 29, 2011

(65) Prior Publication Data
US 2013/0069316 A1    Mar. 21, 2013

(30) Foreign Application Priority Data

Jun. 24, 2010    (JP) .................................. 2010-143765

(51) Int. Cl.
*F16J 15/44*    (2006.01)
*F16J 15/00*    (2006.01)
(Continued)

(52) U.S. Cl.
CPC .............. *F16J 15/16* (2013.01); *F01D 11/001* (2013.01); *F16J 15/3292* (2013.01); *F05D 2240/59* (2013.01)

(58) Field of Classification Search
CPC ........................... F16J 15/3288; F16J 15/3292
USPC ........................................................ 277/355
See application file for complete search history.

(56) References Cited

U.S. PATENT DOCUMENTS 6,267,381 B1    7/2001  Wright
7,413,194 B2 *  8/2008  Wright et al. ................. 277/355
(Continued)

FOREIGN PATENT DOCUMENTS

CN    1963270 A      5/2007
EP    0 391 676 A1  10/1990
(Continued)

OTHER PUBLICATIONS

Korean Notice of Preliminary Rejection issued Jan. 10, 2014 in corresponding Korean Patent Application No. 10-2012-7031194 with English Translation.
(Continued)

*Primary Examiner* — Gilbert Lee
(74) *Attorney, Agent, or Firm* — Wenderoth, Lind & Ponack, L.L.P.

(57) ABSTRACT

An axial seal structure includes a high-pressure-side regulating member configured to regulate the flow of a fluid from a high-pressure-side region to multiple thin sheet seal pieces arranged with a minute gap between each of the multiple thin sheet seal pieces in a circumferential direction along a high pressure side of the multiple thin sheet seal pieces and along an outer peripheral surface of a rotating shaft. The high-pressure-side regulating member has multiple wires that are flexible. Respective longitudinal directions of the multiple wires are directed towards a direction having a radial component of the rotating shaft. Tips that are radial inner ends of the wires form free ends, and are in close proximity to or in contact with the outer peripheral surface of the rotating shaft. The wires that are adjacent to each other in the circumferential direction come into contact with each other partially in the longitudinal directions.

20 Claims, 9 Drawing Sheets

(51) Int. Cl.
 *F16J 15/16* (2006.01)
 *F01D 11/00* (2006.01)
 *F16J 15/32* (2006.01)

(56) References Cited

U.S. PATENT DOCUMENTS

| 8,690,158 | B2* | 4/2014 | Beeck ............................ 277/355 |
| 2001/0004145 | A1 | 6/2001 | Wright et al. |
| 2002/0105146 | A1 | 8/2002 | Uehara et al. |
| 2011/0309585 | A1 | 12/2011 | Uehara et al. |

FOREIGN PATENT DOCUMENTS

| GB | 2 286 434 | 8/1995 |
| JP | 2003-14130 | 1/2003 |
| JP | 2004-162569 | 6/2004 |
| JP | 2005-308039 | 11/2005 |
| JP | 2006-112491 | 4/2006 |
| JP | 4031699 | 1/2008 |
| JP | 2009-281437 | 12/2009 |

OTHER PUBLICATIONS

International Search Report issued Aug. 30, 2011 in International (PCT) Application No. PCT/JP2011/064391.

Written Opinion of the International Searching Authority issued Aug. 30, 2011 in International (PCT) Application No. PCT/JP2011/064391.

Chinese Office Action issued Jul. 2, 2014 in corresponding Chinese Patent Application No. 201180026479.0 with English translation.

Korean Notice of Decision to Grant issued Sep. 24, 2014 in corresponding Korean Patent Application No. 10-2012-7031194 with English translation.

\* cited by examiner

FIG. 5
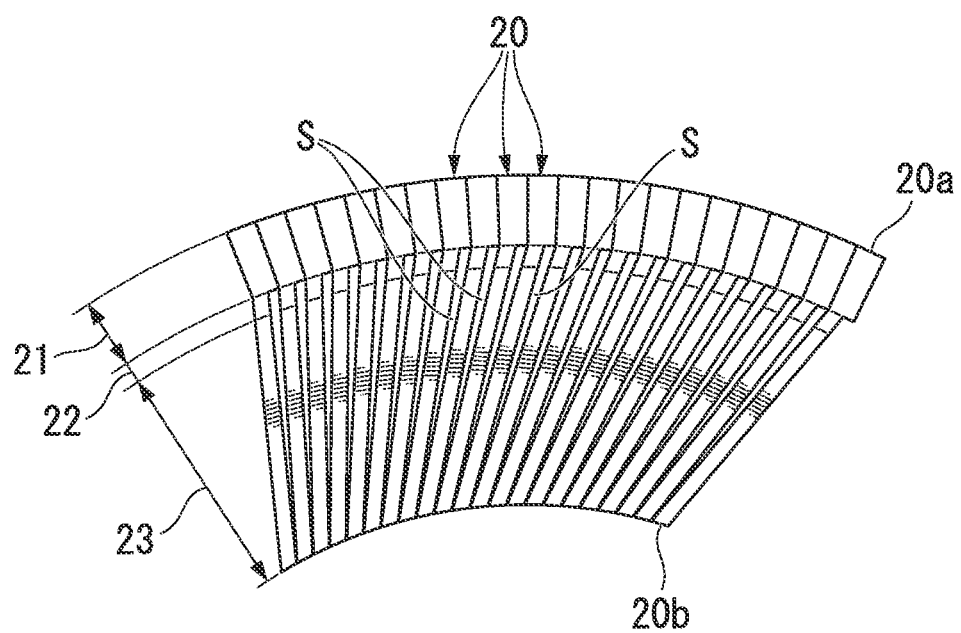
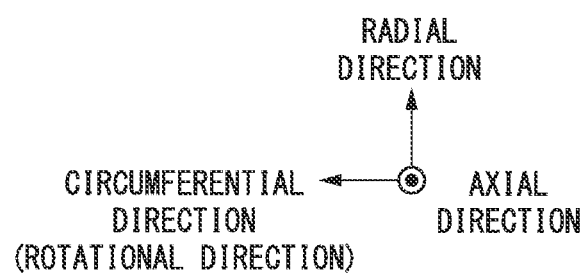

AXIAL SEAL STRUCTURE AND ROTATION MECHANISM PROVIDED WITH SAME

BACKGROUND OF THE INVENTION

1. Technical Field

The present invention relates to an axial seal structure and a rotation mechanism provided with the axial seal structure that restricts the flow of a fluid in an axial direction wherein multiple thin sheet seal pieces are arranged at minute intervals in a circumferential direction around the rotating shaft.

Priority is claimed on Japanese Patent Application No. 2010-143765, filed Jun. 24, 2010, the content of which is incorporated herein by reference.

2. Description of the Related Art

An axial seal structure is provided around the axis of a rotating shaft of rotation mechanisms, such as a gas turbine and a steam turbine, in order to reduce the leakage amount of a working fluid that flows from a high pressure side to a low pressure side. As an example of this axial seal structure, an axial seal structure described in the following Patent Document 1 is known, for example.

This axial seal structure is provided with multiple thin sheet seal pieces. In this axial seal structure, multiple thin sheet seal pieces are arranged around the rotating shaft with minute gaps from each other in the circumferential direction such that their respective thickness direction faces the circumferential direction of the rotating shaft. The respective thin sheet seal pieces are arranged in an inclined manner so that their radial inner ends are located closer to the rotational direction side of the rotating shaft rather than their radial outer ends.

In the above axial seal structure, the radial inner ends of the respective thin sheet seal pieces are free ends, and contact the rotating shaft when the rotating shaft remains stationary. However, if the rotating shaft rotates, the radial inner ends of the respective thin sheet seal pieces are floated from the outer peripheral surface of the rotating shaft by a dynamic pressure effect produced by the rotation of the rotating shaft, and are brought into a non-contact state with the rotating shaft. For this reason, in the above axial seal structure, wear of the respective thin sheet seal pieces is suppressed, and the lifespan of the seals becomes long.

Incidentally, a floating force for the respective thin sheet seal pieces is influenced by the presence of gaps between high-pressure-side edges of the respective thin sheet seal pieces and a high-pressure-side fixing member that is fixed to a casing and faces the high-pressure-side edges. The working fluid on the high pressure side basically leaks to the low pressure side through the minute gaps between the thin sheet seal pieces. In this case, the working fluid of the high pressure side flows radially outward through the gaps between the high-pressure-side edges of the respective thin sheet seal pieces and the high pressure side fixing member that is a portion of the casing while going to the low pressure side, and enters the minute gaps between the respective thin sheet seal pieces from the radial outside. Then, the working fluid that has entered the minute gaps flows radially inward while going to the low pressure side. For this reason, the flow of the working fluid in the minute gaps of the respective thin sheet seal pieces acts as a force that offsets a radial outward force for the respective thin sheet seal pieces produced by the aforementioned dynamic pressure effect.

Thus, in the above axial seal structure, as high-pressure-side regulating device for regulating the flow of the working fluid from the high pressure side to the minute gaps of the respective thin sheet seal pieces, a flexible plate is arranged at the gaps between the high-pressure-side faces of the respective thin sheet seal pieces and the high pressure side fixing member, and a floating force for the respective thin sheet seal pieces is secured.

Incidentally, the gap between the inner peripheral edge of the above flexible plate and the outer peripheral surface of the rotating shaft is preferably formed as small as possible in order to regulate the flow of the working fluid from the high pressure side to the minute gaps of the respective thin sheet seal pieces. However, if the contact between the flexible plate and the rotating shaft during vibration or eccentric rotation is taken into consideration, it is preferable to have a certain size.

Thus, in the above axial seal structure, multiple slits are formed on the inner peripheral side of the flexible plate, the flexibility is enhanced closer to the inner peripheral side of the flexible plate than the outer peripheral side thereof, and the gap between the inner peripheral edge of the flexible plate and the outer peripheral surface of the rotating shaft is formed small. Therefore, the flow of the working fluid from the high pressure side to the minute gaps of the respective thin sheet seal pieces is regulated, while avoiding damage or the like of the flexible plate, by deforming the inner peripheral side of the flexible plate even if the flexible plate contacts the rotating shaft during vibration or eccentric rotation.

CITATION LIST

Patent Document

Patent Document 1: Japanese Patent No. 4031699

Technical Problem

In the technique described in the above Patent document 1, the flexibility on the inner peripheral side of the flexible plate as the high-pressure-side regulating device is increased, and the gap between the inner peripheral edge of the flexible plate and the outer peripheral surface of the rotating shaft is formed small. Thereby, the flow of the working fluid from the high pressure side to the minute gaps of the respective thin sheet seal pieces can be regulated while avoiding damage or the like of the flexible plate. However, in the technique described in above Patent Document 1, the multiple slits are formed on the inner peripheral side of the flexible plate and the flexibility on the inner peripheral side of the flexible plate is enhanced. Therefore, there is inflow of the working fluid from the multiple slits to the minute gaps of the respective thin sheet seal pieces, and the flow of the working fluid is not sufficiently regulated. For this reason, even in the technique described in the above Patent Document 1, there is a problem that the radial outward force for the respective thin sheet seal pieces produced by the aforementioned dynamic pressure effect is offset by the flow of this working fluid, and the floating force for the respective thin sheet seal pieces cannot be sufficiently secured.

SUMMARY OF THE INVENTION

The invention pays attention to such problems in the related art, and an object thereof is to provide an axial seal structure that can sufficiently secure a floating force to respective thin sheet seal pieces, while avoiding damage to high-pressure-side regulating device by vibration or eccentric rotation of a rotating shaft.

Solution to Problem

In an axial seal structure related to a first aspect of the invention, multiple thin sheet seal pieces are arranged within an annular space between the outer peripheral side of a rotating shaft and a casing surrounding the periphery of the rotating shaft with minute gaps from each other in the circumferential direction such that their respective thickness direction is directed toward the circumferential direction of the rotating shaft. Moreover, in the above axial seal structure, radial inner ends of the multiple thin sheet seal pieces are formed at free ends, and radial outer ends of the multiple thin sheet seal pieces are coupled together and divide the annular space into a high-pressure-side region and a low-pressure-side region in the axial direction of the rotating shaft.

Moreover, the axial seal structure includes high-pressure-side regulating device that is arranged within the annular space and regulates the flow of a fluid from the high pressure side to the multiple thin sheet seal pieces along the high pressure side of the multiple thin sheet seal pieces and along an outer periphery of the rotating shaft. Additionally, the high-pressure-side regulating device has flexible multiple wires that are densely arranged in the circumferential direction of the rotating shaft, and respective longitudinal directions of the multiple wires face a direction having a radial component of the rotating shaft. Additionally, tips that are respective radial inner ends of the multiple wires form the free ends, and are brought into close proximity to or into contact with the outer peripheral surface of the rotating shaft. Moreover, base ends that are respective radial outer ends of the multiple wires are coupled together so that the wires that are adjacent to each other in the circumferential direction come into contact with each other at least partially in the longitudinal directions.

In the axial seal structure, in the flexible multiple wires that are constituent elements of the high-pressure-side regulating device, the wires that are adjacent to each other in the circumferential direction come into contact with each other at least partially in the longitudinal directions. As a result, the amount of the fluid, which enters the minute spaces between the multiple thin sheet seal pieces through the high-pressure-side regulating device from the radial outside, can be reduced. For this reason, the flow of the working fluid in the minute spaces can be regulated, and the flow rate of the working fluid, which resists a radial outward force (floating force) for the respective multiple thin sheet seal pieces produced by a dynamic pressure effect between the rotating shaft, can be reduced. Hence, according to the above axial seal structure, the floating force for the respective thin sheet seal pieces can be sufficiently secured. Moreover, according to the above axial seal structure, vibration or eccentric rotation of the rotating shaft is dealt with by deformation of the multiple wires of the high-pressure-side regulating device. Therefore, damage to the high-pressure regulating device can be avoided.

Here, in the axial seal structure, the high-pressure-side regulating device may have a plurality of wire groups that are densely arranged in the axial direction of the rotating shaft. Moreover, each of the plurality of wire groups may have the multiple wires that are densely arranged in the circumferential direction of the rotating shaft.

In the above axial seal structure, the high-pressure-side regulating device has a plurality of wire groups that are densely arranged in the axial direction of the rotating shaft. Therefore, the amount of the fluid, which enters the minute spaces between the multiple thin sheet seal pieces through the high-pressure-side regulating device from the radial outside, can be further reduced.

Additionally, in the axial seal structure, it is preferable that the multiple wires be respectively provided in an inclined manner so that their tips are located on the rotational direction side of the rotating shaft with respect to the base ends.

In the above axial seal structure, since the respective wires are inclined as described above, the tip side of the respective wires are apt to bend radially outward. Therefore, even if the rotating shaft moves in a near-and-far direction relative to the high-pressure-side regulating member, the respective wires can be deformed in the radial direction without difficulties.

In this case, it is preferable that the multiple thin sheet seal pieces be respectively inclined so that the radial inner ends are located on the rotational direction side of the rotating shaft with respect to the radial outer ends, and the inclination amount of the multiple wires are different from the inclination amount of the multiple thin sheet seal pieces.

In the above axial seal structure, the inclination amount of the multiple wires is different from the inclination amount of the multiple thin sheet seal pieces. Therefore, the amount of the fluid, which enters the minute spaces between the multiple thin sheet seal pieces through the high-pressure-side regulating device, can be further reduced.

Additionally, in an axial seal structure related to a second aspect of the invention, the high-pressure-side regulating device may have a thickness direction facing the axial direction of the rotating shaft, may form a circular-arc belt shape as seen from the axial direction, and may have a side plate that is brought into close proximity to or into contact with the high pressure side and/or the low pressure side of the multiple wires on the base end side of the multiple wires. Moreover, a radial inner end of the side plate may be located radially outside the radial inner edge of the casing.

In the above axial seal structure, a side plate, which is brought into close proximity to or into contact with the high pressure side and/or the low pressure side of the multiple wires, is provided. Therefore, the amount of the fluid, which enters the minute spaces between the multiple thin sheet seal pieces through the high-pressure-side regulating device from the radial outside, can be further reduced.

In this case, it is preferable that the base ends of the multiple wires and the radial outer ends of the side plate be joined together, and that the wires not be joined to a portion of the side plate radially inside the radial outer ends.

In the axial seal structure, the portion where a wire can be independently deformed with respect to the side plate in the radial direction can be increased.

Additionally, a rotation mechanism related to a third aspect of the invention is provided with the axial seal structure, the rotating shaft, and the casing.

Advantageous Effects of Invention

In the invention, the floating force for the respective thin sheet seal pieces can be sufficiently secured, while avoiding damage to the high-pressure-side regulating device by vibration or eccentric rotation of the rotating shaft.

BRIEF DESCRIPTION OF THE DRAWINGS

FIG. 5 is a view showing thin sheet seal pieces seen from the axial direction, in the first embodiment related to the invention.

DESCRIPTION OF EMBODIMENTS

An embodiment of an axial seal structure and a gas turbine facility provided with the axial seal structure related to the invention will be described below with reference to the drawings.

"Configuration of Gas Turbine Facility"

Figure 1:
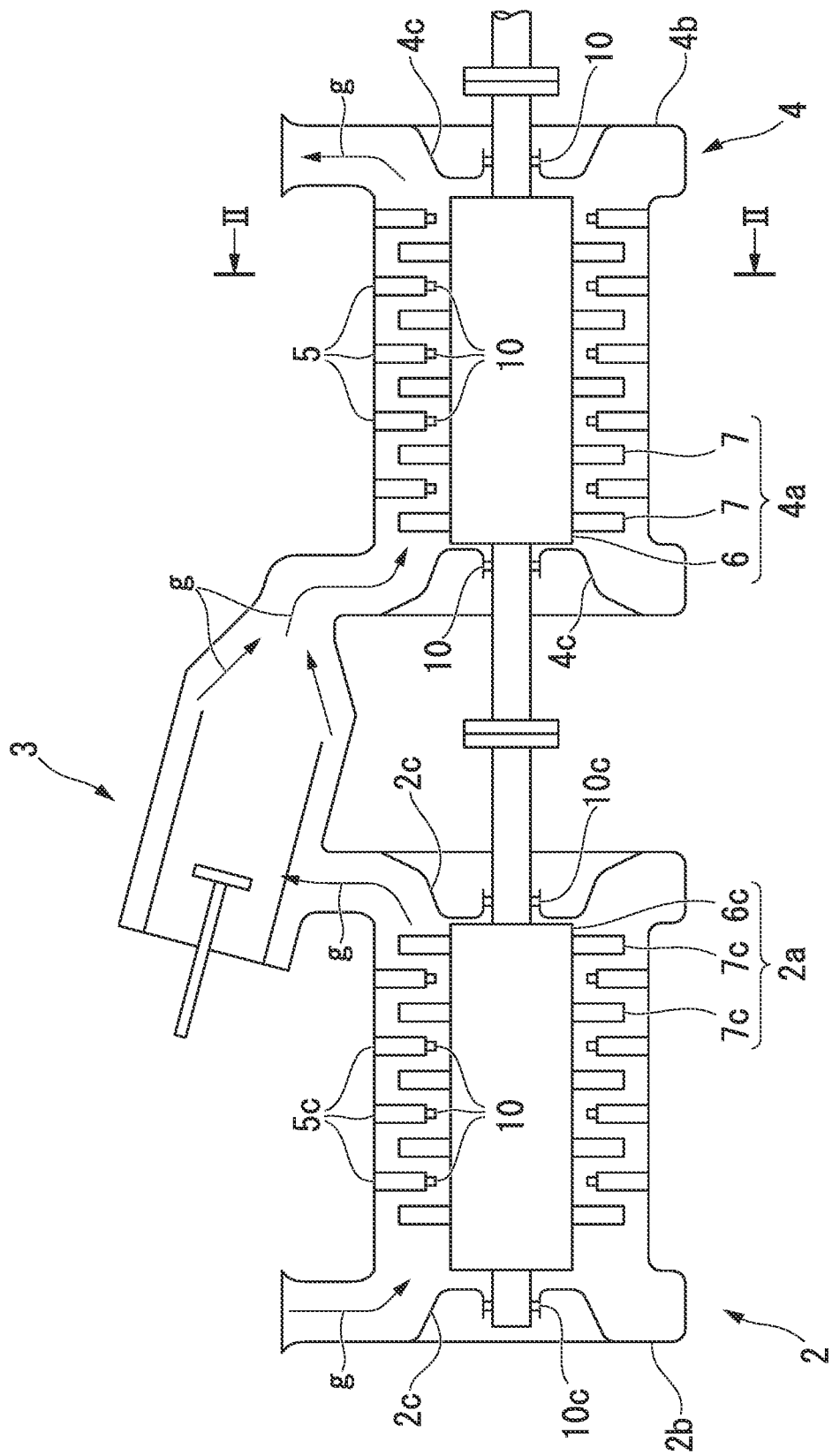
FIG. 1 is a configuration view of a gas turbine facility in one embodiment related to the invention.

As shown in FIG. 1, a gas turbine facility is provided with a compressor (rotation mechanism) 2 that takes in and compresses a large amount of air thereinto, a combustor 3 that mixes fuel with the compressed air compressed in the compressor 2 and combusts the mixture, and a gas turbine (rotation mechanism) 4 that transforms the heat energy of the combustion gas introduced from the combustor 3 into rotational energy.

The compressor 2 has a casing 2b and a rotor 2a that rotates within the casing 2b, and the turbine 4 has a casing 4b and a rotor 4a that rotates within the casing 4b. A group 5c, 5 of a plurality of annular stator vanes is fixed at intervals in an axial direction within each casing 2b, 4b. Each annular stator vane group 5c, 5 is configured to have a plurality of stator vanes that is fixed at intervals from each other in a circumferential direction on the inner surface of each casing 2b, 4b. Additionally, each rotor 2a, 4a has a rotating shaft 6c, 6, and a group 7c, 7 of a plurality of annular movable vanes that is fixed at intervals in the axial direction of the rotating shaft 6c, 6. Each annular movable vane group 7c, 7 is configured to have a plurality of movable vanes that is fixed at intervals from each other in the circumferential direction, at the outer periphery of the rotating shaft 6c, 6. The group 5c, 5 of a plurality of annular stator vanes and a plurality of annular movable vanes 7c, 7 are alternately arranged in the axial direction of the rotating shaft 6c, 6. The rotor 2a of the compressor 2 and the rotor 4a of the gas turbine 4 are coupled so as to rotate integrally.

In the compressor 2 and the gas turbine 4, in order to prevent a working fluid (compressed air or combustion gas) g from leaking out in the axial direction from the high pressure side to the low pressure side, an axial seal structure 10c, 10 is provided at an inner peripheral portion of each annular stator vane group 5c, 5. Additionally, in order to prevent the working fluid g from leaking from the high pressure side to the low pressure side, an axial seal structure 10c, 10 is provided even at a bearing 2c, 4c where the casing 2b, 4b supports the rotating shaft 6c, 6.

Figure 2:
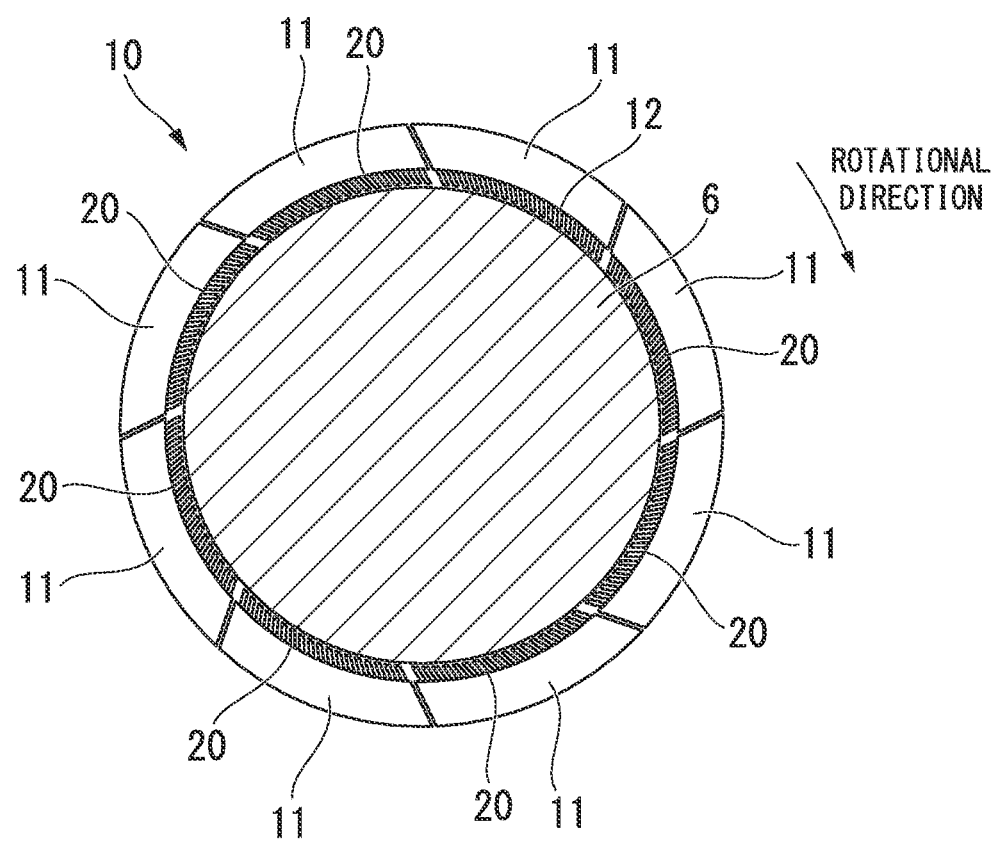
FIG. 2 is a cross-sectional view taken along line II-II in FIG. 1.

As shown in FIG. 2, the axial seal structure 10 of the gas turbine 4 is configured by arranging a plurality of (eight in the present embodiment) seal segments 11, which extends in an arc shape, in the circumferential direction around the rotating shaft 6. In addition, FIG. 2 is a cross-sectional view taken along line II-II in FIG. 1.

An embodiment of the axial seal structure 10 of the gas turbine 4 will be described below. In addition, the axial seal structure 10 of the gas turbine 4 will be described below. Since the axial seal structure 10c of the compressor 2 also has basically the same configuration, description of the axial seal structure 10c of the compressor 2 will be omitted.

"First Embodiment of Axial Seal Structure"

Figure 3:
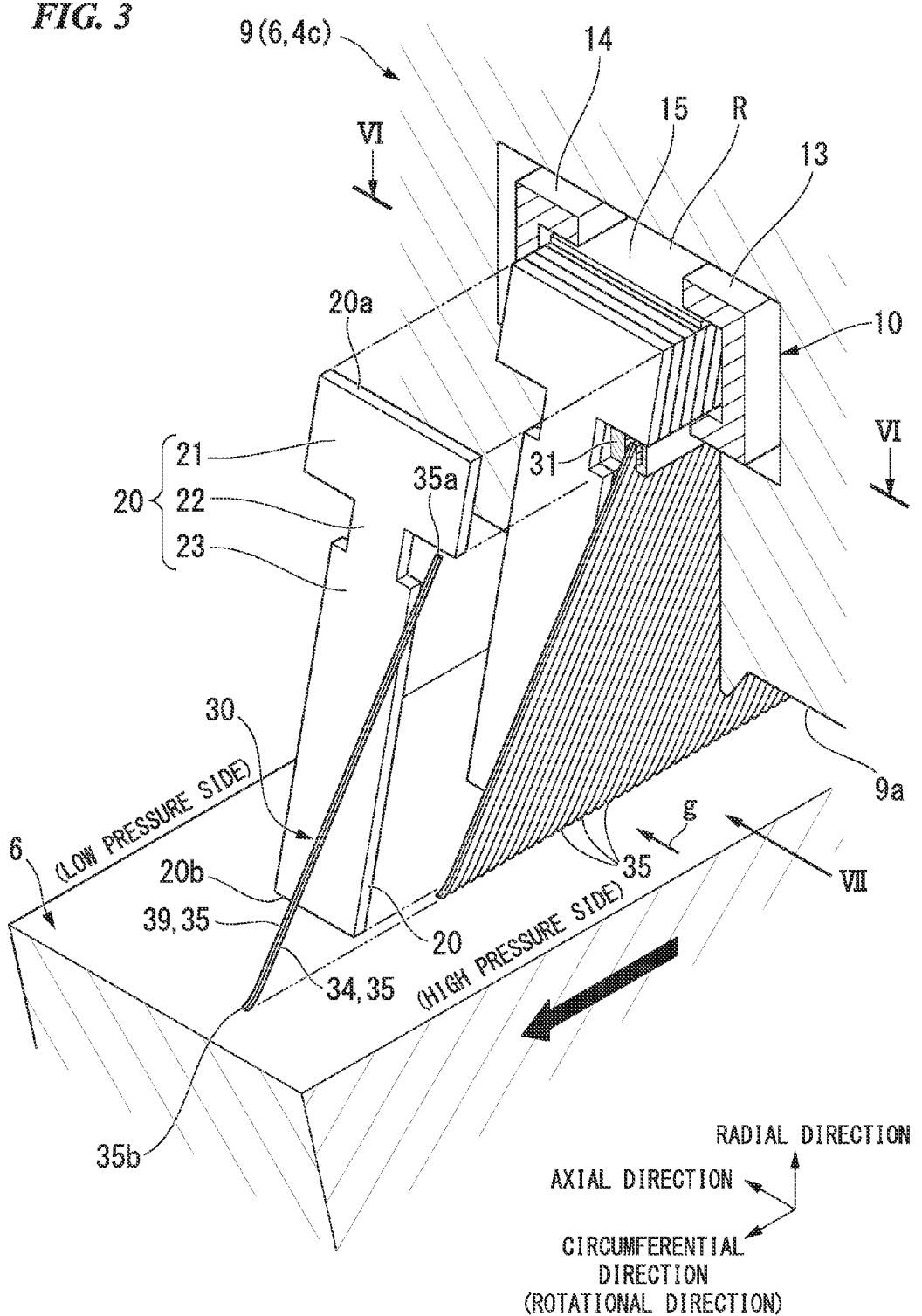
FIG. 3 is a cutaway perspective view of main parts of an axial seal structure in a first embodiment related to the invention.
Figure 4:
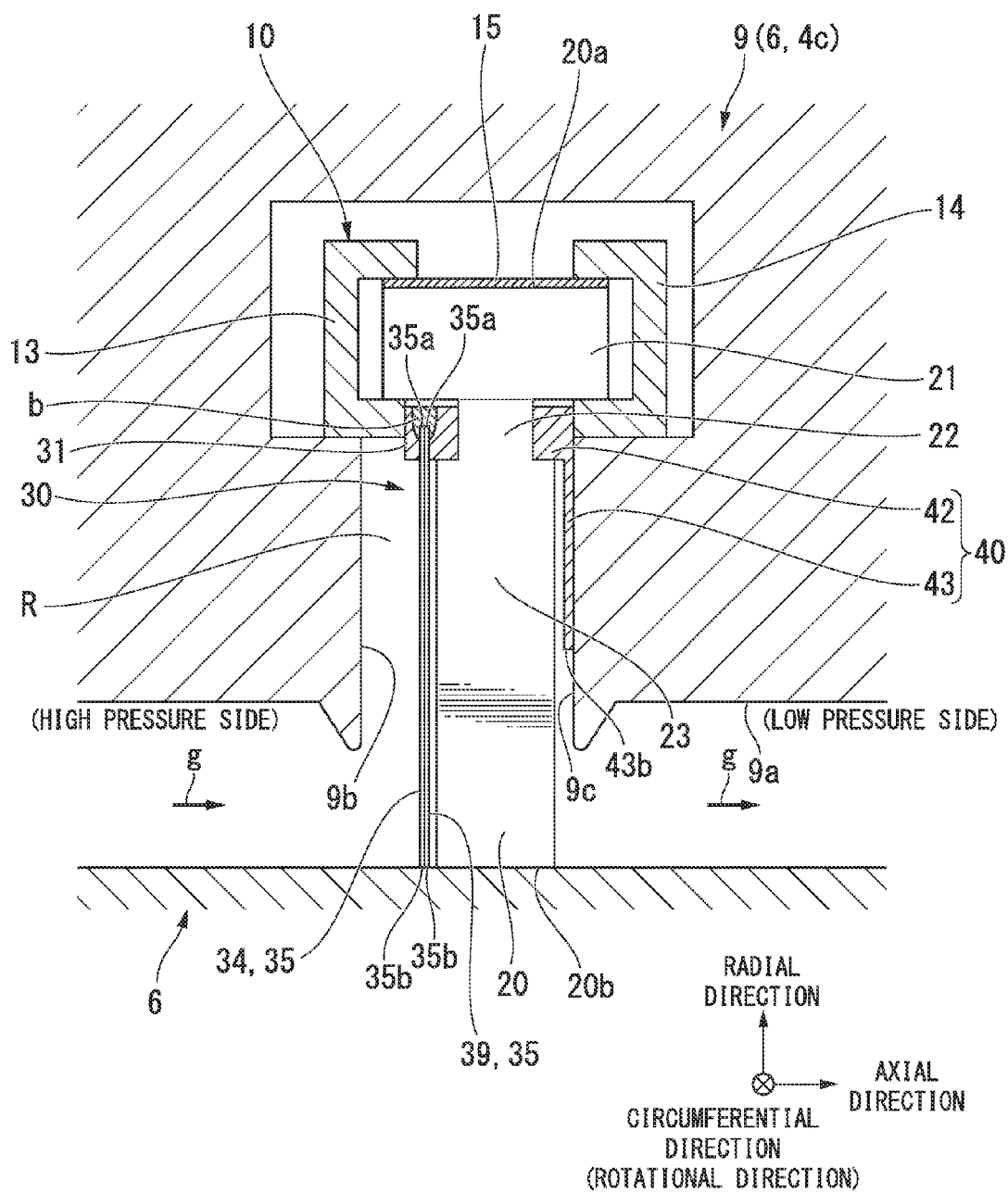
FIG. 4 is a cross-sectional view of the axial seal structure in the first embodiment related to the invention.

As shown in FIGS. 3 and 4, the axial seal structure 10 is arranged within an annular space R that is recessed toward the outside from the inner peripheral surfaces of the annular stator vane group 5 and bearing 4c (hereinafter, the annular stator vane group 5 and the bearing 4 are simply referred to as a casing 9) provided in the casing of the gas turbine.

The axial seal structure 10 is provided with multiple thin sheet seal pieces 20, holding rings 13 and 14 that have a c-shaped section and hold multiple thin sheet seal pieces 20, a back spacer 15 that is arranged on the casing 9 side of the multiple thin sheet seal pieces 20, a high-pressure-side regulating member 30 that is arranged on the high pressure side of the multiple thin sheet seal pieces 20, and a low-pressure-side regulating member 40 that is arranged on the low pressure side of the multiple thin sheet seal pieces 20.

As shown in FIG. 3, the thin sheet seal piece 20 is a member mainly formed of a thin steel sheet. The thin sheet seal piece 20 is formed in the shape of the letter T as seen from the circumferential direction of the rotating shaft 6, and its width direction faces the axial direction of the rotating shaft 6, in other words, its thickness direction faces the circumferential direction of the rotating shaft 6.

The thin sheet seal piece 20 has a head 21, a trunk 23 that is formed such that its width dimension and thickness dimension are smaller than those of the head 21, and a neck 22 that is located between the head 21 and the trunk 23 and is formed such that its width dimension is smaller than the head 21 and the trunk 23. The thin sheet seal piece 20 is formed in order of the head 21, the neck 22, and the trunk 23 from the outside toward the inside, in the radial direction of the rotating shaft 6.

In the multiple thin sheet seal pieces 20, radial outer ends of the respective heads 21, that is, radial outer ends 20a of the thin sheet seal pieces 20 are welded together and coupled together. Additionally, the trunks 23 of the multiple thin sheet seal pieces 20 are formed so as to be elastically deformable, radial inner ends of the respective trunks 23, that is, radial inner ends 20b of the thin sheet seal pieces 20 form free ends and are in contact with the outer peripheral surface of the rotating shaft 6 when the rotating shaft 6 does not rotate.

As shown in FIG. 5, the multiple thin sheet seal pieces 20 are arranged at minute intervals s from each other in the circumferential direction. Specifically, in the multiple thin sheet seal pieces 20, the thickness dimension of the head 21 is set to be larger than the thickness dimension of the neck 22 and the trunk 23, whereby a minute gaps s is formed between the trunks 23 of two thin sheet seal pieces 20 that are adjacent to each other in the thickness direction.

As the holding rings 13 and 14, as shown in FIGS. 3 and 4, a high-pressure-side holding ring 13 and a low-pressure-side holding ring 14 are used. Both the holding rings 13 and 14 are circular-arc members that have a C-shaped section, constitute a groove portion inside the C-shape, and extend in the circumferential direction of the rotating shaft 6. The width (dimension of the groove portion in the radial direction of the rotating shaft 6) of the groove portion of each holding ring 13, 14 is set to be slightly greater than the dimension 0 of the head 21 of the thin sheet seal piece 20 in the radial direction. The high pressure side of the head 21 of the thin sheet seal piece 20 is put into the groove portion of the high-pressure-side holding ring 13, and the low pressure side of the head 21 of the thin sheet seal piece 20 is put into the groove portion of the low-pressure-side holding ring 14. The back spacer 15 is fitted between the side wall of the groove portion of each holding ring 13, 14 and the head 21 of the thin sheet seal piece 20. Thereby, the heads 21 of the multiple thin sheet seal pieces 20 are held by the holding rings 13 and 14.

The low-pressure-side regulating member 40 is a low-pressure-side side seal plate whose thickness direction faces the axial direction and whose shape as seen from the axial direction is a circular-arc shape, and is arranged on the low pressure side of the multiple thin sheet seal pieces 20. The low-pressure-side side seal plate 40 has a base portion 42 on the radial outside and a thin sheet seal piece portion 43 on the radial inside. The thickness (axial dimension) of the base portion 42 is greater than the thickness of the thin sheet seal piece portion 43, so that the base portion protrudes to the high pressure side with respect to the thin sheet seal piece portion 43. The base portion 42 enters a low-pressure-side recess between the head 21 and the trunk 23 of the thin sheet seal piece 20, and is sandwiched between the neck 22 of the thin sheet seal piece 20 and the tip of an inner-peripheral-side end portion of the low-pressure-side holding ring 14 having the C-shaped section.

The thin sheet seal piece portion 43 of the low-pressure-side side seal plate 40 extends to a position slightly outside the position of an inner peripheral surface 9a of the casing 9 radially inward from the base portion 42. In other words, the distance from the outer peripheral surface of the rotating shaft 6 to a radial inner end 43b of the thin sheet seal piece plate 43 is longer than the distance from the outer peripheral surface of the rotating shaft 6 to the inner peripheral surface 9a of the casing 9.

The high-pressure-side regulating member 30 has a first wire group 34 and a second wire group 39 each including multiple wires 35, and a wire base 31 to which one end of each of all the wires 35 that constitute each wire group 34, 39 is brazed. The wire base 31 is formed from two plates including a high-pressure-side plate and a low-pressure-side plate. Each wire 35 is formed such that its longitudinal direction faces a direction having a radial component of the rotating shaft 6. Each wire 35 is brazed to two plates that constitute the wire base 31 in a state where its radial outer end forms a base end 35a, and the base end 35a is sandwiched between the two plates of the wire base 31. As a result, the base ends 35a of the respective wires 35 are coupled together, and the two plates that constitute the wire base 31 are also joined together. In addition, symbol "b" represents a brazed portion in FIG. 4. Additionally, the radial inner end of each wire 35 forms a tip 35b as a free end, and is in contact with the outer peripheral surface of the rotating shaft 6.

The wire base 31 enters a high-pressure-side recess between the head 21 and the trunk 23 of the thin sheet seal piece 20, and is sandwiched between the neck 22 of the thin sheet seal piece 20 and the tip of an inner-peripheral-side side portion of the high-pressure-side holding ring 13 having the C-shaped section.

Figure 6:
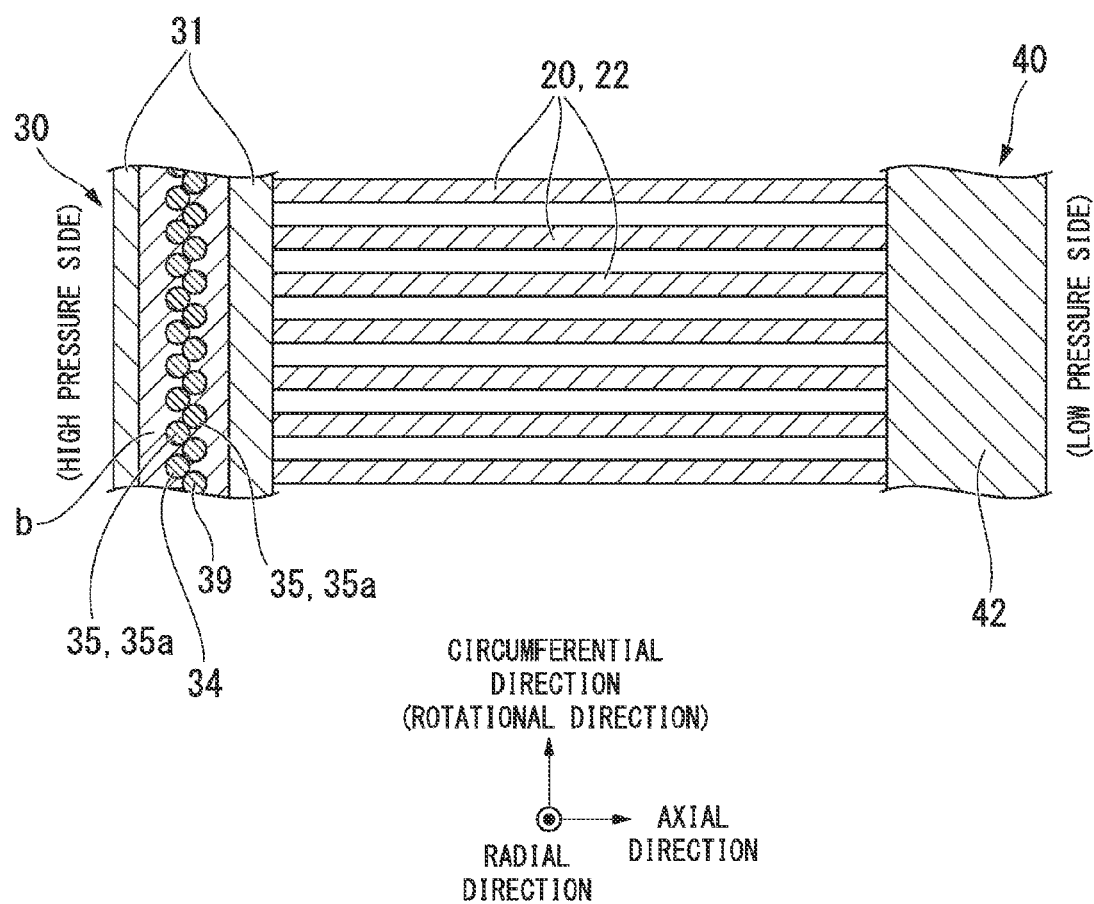
FIG. 6 is an end view taken along line VI-VI in FIG. 3.

FIG. 6 is an end view taken along line VI-VI in FIG. 3. As shown in FIG. 6, the respective wires 35 that constitute the first wire group 34 and the second wire group 39 are arranged in the circumferential direction.

Predetermined intervals are formed in the circumferential direction between the base ends 35a of the respective wires 35. Additionally, the first wire group 34 and the second wire group 39 are aligned in the axial direction. The wires 35 that constitute the second wire group 39 are arranged at positions between a plurality of wires that constitutes the first wire group 35, in the circumferential direction. The base ends 35a of the wires 35 that constitute the second wire group 39 are in mutually axial contact with the base ends 35a of the wires 35 that constitute the first wire group 34. That is, in the present embodiment, the multiple wires 35 are densely arranged in the circumferential direction and the axial direction, on the high pressure side of the multiple thin sheet seal pieces 20.

Figure 7:
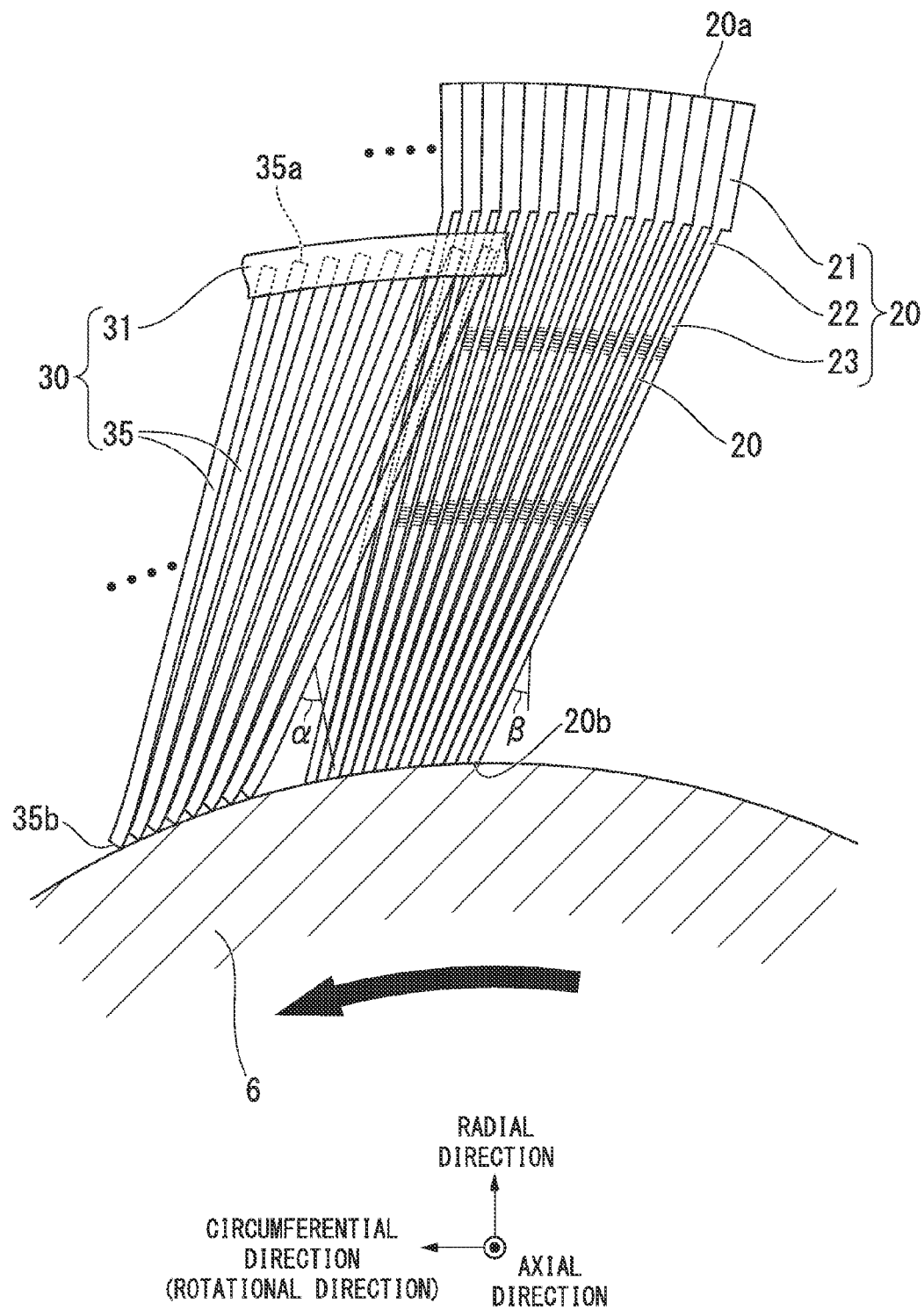
FIG. 7 is a view seen in the direction of arrow VII in FIG. 3.

FIG. 7 is a view as seen from the direction of VII in FIG. 3. As shown in FIG. 7, the respective wires 35 of the high-pressure-side regulating member 30 incline so that their tips 35b are located on the rotational direction side of the rotating shaft 6 with respect to the base ends 35a. Additionally, the respective thin sheet seal pieces 20 are also inclined so that their radial inner ends 20b are located on the rotational direction side of the rotating shaft 6 with respect to the radial outer ends 20a. The inclination amount of each wire 35, that is, the angle α between the wire 35 and the normal line of the rotating shaft 6, is greater than the inclination amount of each thin sheet seal piece 20, that is, the angle β between the thin sheet seal piece 20 and the normal line of the rotating shaft 6. Incidentally, predetermined intervals are formed in the circumferential direction between base ends 35a of the respective wires 35, and side portions of the tips 35b of the respective wires 35 contact each other in the circumferential direction. As for the mutual intervals between a plurality of normal lines in the rotating shaft 6, the intervals at positions near to the center of the rotating shaft 6 are narrower than the intervals at positions distant from the center of the rotating shaft 6. Thus, in the present embodiment, the intervals between the base ends 35a of the respective wires 35 are set so that the side portions of the tips 35b of the respective wires 35 contact each other in the circumferential direction.

All of the thin sheet seal pieces 20 and the respective wires 35 of the high-pressure-side regulating member 30 member are formed from Inconel (registered trademark)-based alloys that are Ni group alloys, Stellite (registered trademark)-based alloys that are Co group alloys, or the like, which are rich in elasticity and have excellent heat resistance.

Next, the working effects of the axial seal structure in the present embodiment will be described.

Figure 8:
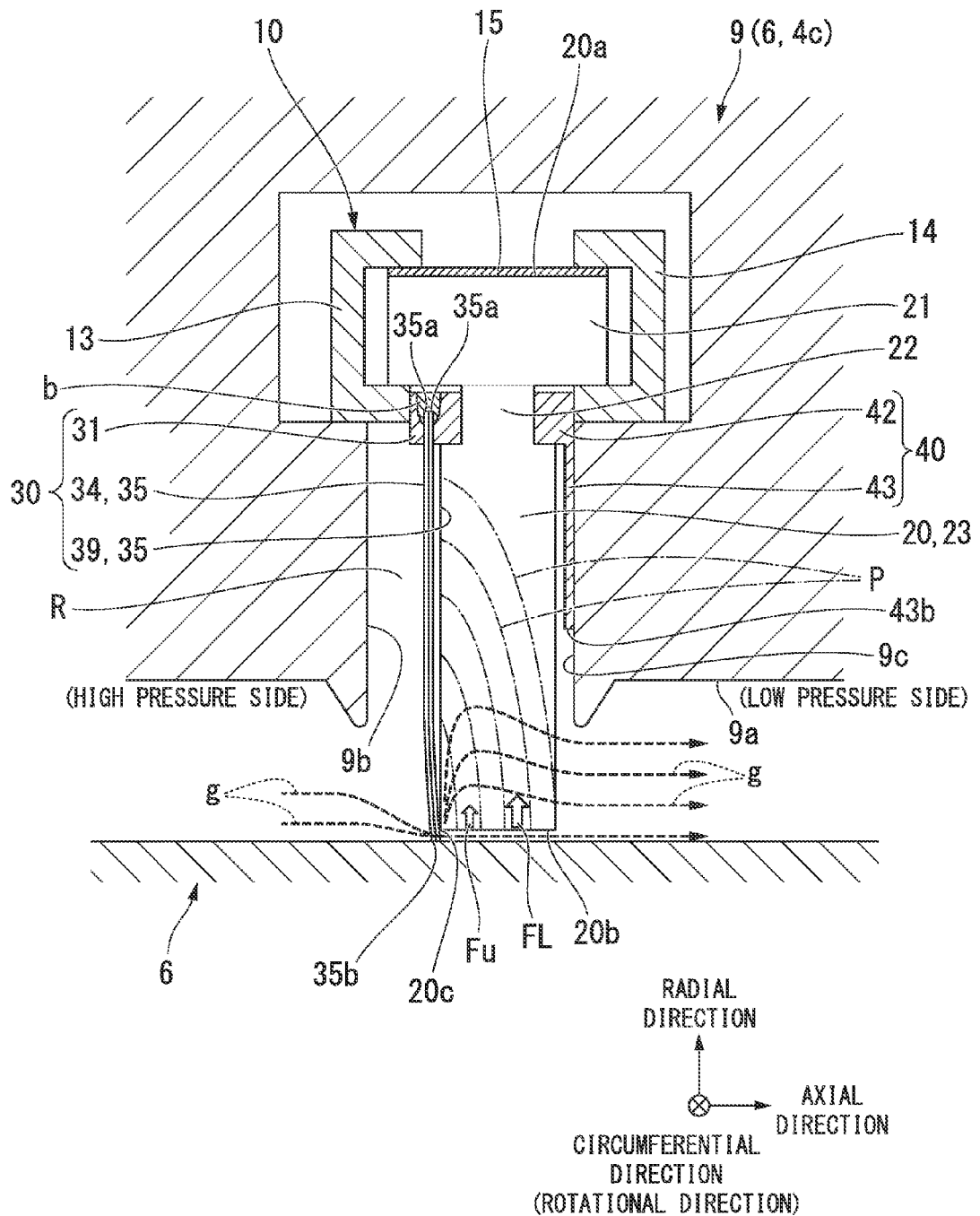
FIG. 8 is an explanatory view showing the flow and pressure distribution of a working fluid in the axial seal structure in the first embodiment related to the invention.

If a working fluid g that is combustion gas flows into the gas turbine 4 from the combustor 3 (shown in FIG. 1) and the rotating shaft 6 rotates, the radial inner ends 20b of the thin sheet seal pieces 20 and the trunks 23 of the thin sheet seal pieces 20 receive a radially outward force FL by a dynamic pressure effect produced by the rotation of the rotating shaft 6, as shown in FIG. 8. As a result, the radial inner ends 20b of the respective thin sheet seal pieces 20 are floated from the outer peripheral surface of the rotating shaft 6. Thereby, friction is not produced between the thin sheet seal piece 20 and the rotating shaft 6, wear of the thin sheet seal pieces 20 is suppressed, and the lifespan of the axial seal structure 10 becomes long.

Additionally, the tips 35b of the respective wires 35 of the high-pressure-side regulating member 30 and the trunks 23 of the wires 35 also receive the radially outward force FL by the dynamic pressure effect produced by the rotation of the rotating shaft 6 if the rotating shaft 6 rotates. However, the trunks 23 of the thin sheet seal pieces 20 are formed on a plane, and receive a radial outward force on this plane, whereas the trunks 23 of the respective wires 35 is formed to have a circular section. Thus, the radial outward force applied to the respective wires 35 is weak due to a factor, such as receiving the radial outward force on a curved surface. For this reason, the tips 35b of the respective wires 35 are not floated from the outer peripheral surface of the rotating shaft 6 or are very slightly floated.

Additionally, the respective wires 35 are deformed under the pressure of the working fluid from the high pressure side, and the tips 35b side of the respective wires 35 closely contacts the high-pressure-side edges of the thin sheet seal pieces 20.

Incidentally, the working fluid g slightly leaks to the low pressure side through between the multiple wires 35 of the high-pressure-side regulating member 30, through the minute gaps s of the multiple thin sheet seal pieces 20, and through between the radial inner ends 20b of the multiple thin sheet seal pieces 20 and the outer peripheral surfaces of the rotating shaft 6, from the high pressure side.

If the high-pressure-side regulating member 30 is not provided, as described in the Background Art section, the working fluid g flows radially outward through the gaps between the high-pressure-side side wall 9b of the recess (the bottom of the recess faces the radial outside) of the casing 9 and the thin sheet seal pieces 20 that form the annular space R, while going from the high pressure side to the low pressure side. Thereafter, the working fluid g enters the minute gaps s of the respective thin sheet seal pieces 20. Then, the working fluid g that has entered the minute gaps s flows toward the radial inside and comes out from the minute spaces s, while going to the low pressure side. For this reason, the flow of the working fluid g in the minute gaps s of the respective thin sheet seal pieces 20 acts as a force that offsets the radial outward force FL for the respective thin sheet seal pieces 20 produced by the dynamic pressure effect caused by the rotation of the rotating shaft 6.

On the other hand, if the high-pressure-side regulating member 30 is provided like the present embodiment, the working fluid g flows radially outward through the gaps between the high-pressure-side side wall 9b of the recess of the casing 9 that forms the annular space R and the thin sheet seal pieces 20, while going from the high pressure side to the low pressure side. Thereafter, even if the working fluid g tries to enter the minute gaps of the respective thin sheet seal pieces 20, since the high-pressure-side regulating member 30 is provided on the high pressure side of the respective thin sheet seal pieces 20, the working fluid g hardly enters the minute spaces s of the respective thin sheet seal pieces 20 from a radial outer position.

For this reason, if the high-pressure-side regulating member 30 is present, most of the working fluid g enters the minute gaps s of the respective thin sheet seal pieces 20 from portions where resistance of flow against to the working fluid g is the smallest, that is, portions between the radial inner ends 20b (hereafter, referred to as high-pressure-side tips 20c) of the high-pressure-side edges of the respective thin sheet seal pieces 20, and the outer peripheral surface of the rotating shaft 6, nearer to the low pressure side than the high-pressure-side regulating member 30.

Moreover, in the present embodiment, the low-pressure-side side seal plate 40 as the low-pressure-side regulating member is arranged on the low pressure side of the respective thin sheet seal pieces 20, and relatively large gaps are secured between the low-pressure-side side wall 9c of the recess of the casing 9 and the thin sheet seal pieces 20 that form the annular space R. Therefore, although the working fluid that has entered the minute spaces s of the respective thin sheet seal pieces 20 flows to the low pressure side, the working fluid is apt to go radially outward.

That is, in the present embodiment, as shown by broken lines in FIG. 8, the working fluid g enters the minute gaps s of the respective thin sheet seal pieces 20 mainly from the high-pressure-side tips 20c of the respective thin sheet seal pieces 20. Thereafter, the working fluid g flows radially outward while going to the low pressure side, and flows out of the minute gaps s.

In other words, in the present embodiment, as shown by one-dot chain lines in FIG. 8, the pressure distribution P of the minute gaps s of the respective thin sheet seal pieces 20 is the highest at the high-pressure-side tips 20c of the respective thin sheet seal pieces 20, and becomes lower toward the low pressure side and radial outside with respect to the high-pressure-side tips 20c.

As described above, in the present embodiment, the working fluid g goes even radially outward when flowing to the low pressure side through the minute gaps g of the respective thin sheet seal pieces 20, the flow of the working fluid g acts as a force Fu that slightly floats the respective thin sheet seal pieces 20. Hence, according to the present embodiment, the floating force for the respective thin sheet seal pieces can be secured, and wear of the respective thin sheet seal pieces 20 can be suppressed.

Additionally, in the present embodiment, the respective wires 35 that are constituent elements of the high-pressure-side regulating member 30 are elastically deformed in the radial direction even if the rotating shaft 6 moves in a near-and-far direction relative to the high-pressure-side regulating member 30 due reasons such as the rotating shaft 6 rotating eccentrically. Thus, damage to the high-pressure-side regulating member 30 can be avoided. Particularly, in the present embodiment, as mentioned above with reference to FIG. 7, the respective wires 35 are inclined so that their tips 35b are located on the rotational direction side of the rotating shaft 6 with respect to the base ends 35a. Therefore, even if the tips 35b side of the respective wires 35 is apt to bend radially outward and the rotating shaft 6 moves in the near-and-far direction relative to the high-pressure-side regulating member 30, the respective wires 35 can be elastically deformed in the radial direction without difficulties. That is, the high-pressure-side regulating member 30 of the present embodiment has extremely high durability against the vibration or eccentric rotation of the rotating shaft 6. In addition, if the slits are formed in the flexible plate (high-pressure-side regulating member) as described in Patent Document 1, the slits can be formed only in a radial inner portion of the flexible plate, and the slits cannot be formed so as to extend to a radial outer portion of the flexible plate. For this reason, constituting the high-pressure-side regulating member 30 by the multiple wires 35 like the present embodiment can more easily widen the region of the high-pressure regulating member 30 that can be elastically deformed in the radial direction more without difficulties from both of design and manufacture than the technique described in Patent Document 1. As a result, the high-pressure-side regulating member 30 can be deformed without difficulties with respect to the movement of the rotating shaft 6 in the near-and-far direction with respect to the high-pressure-side regulating member 30.

In addition, the multiple wires 35 of the high-pressure-side regulating member 30, as mentioned above, hardly float even if the rotating shaft 6 rotates. For this reason, although the wires 35 are worn out, if wear proceeds to a certain degree and gaps are even slightly formed between the wires 35 and the rotating shaft 6, the wires 35 are hardly worn out afterwards.

Additionally, in the present embodiment, as mentioned above with reference to FIGS. 6 and 7, at least portions of the multiple wires 35 of the high-pressure-side regulating member 30 in the longitudinal direction contact each other in the circumferential direction. Thus, the amount of the working fluid that passes between the wires 35 can be reduced. Moreover, in the present embodiment, the first wire group 34 and the second wire group 39 are densely arranged in the axial direction, the wires 35 that constitute the second wire group 39 are arranged in the circumferential direction at positions between the plurality of wires that constitutes the first wire group 35, and the inclination amount of the respective wires 35 and the inclination amount of the respective thin sheet seal pieces 20 are changed. Therefore, the amount of the working fluid g, which enters the minute gaps s between the respective thin sheet seal pieces 20 through the high-pressure-side regulating member 30 from the high pressure side of the high-pressure-side regulating member 30, can be extremely reduced. For this reason, in the present embodiment, reduction in the floating force of the respective thin sheet seal pieces 20 by the working fluid g entering the minute gaps s between the respective thin sheet seal pieces 20 from the radial outer position can be suppressed. As a result, the floating force for the respective thin sheet seal pieces 20 can be sufficiently secured.

Moreover, in the present embodiment, the respective wires 35 are formed in an inclined manner in order to make the tips 35b side of the respective wires 35 easily bend radially outward as mentioned above. However, the respective wires are inclined so that their tips 35b are located on the rotational direction side of the rotating shaft 6 with respect to the base ends 35a. For this reason, the frictional resistance between the respective wires 35 and the rotating shaft 6 can be made smaller than that in a case where the wires are inclined so that that their tips 35b are located on the counter-rotational direction side of the rotating shaft 6. As a result, wear of the respective wires 35 can be reduced. Additionally, in the present embodiment, as mentioned above, the respective wires 35 that constitute the first wire group 34 and the respective wires 35 that constitute the second wire group 39 contact each other in the axial direction. However, the wires 35 that constitute the second wire group 39 are arranged in the circumferential direction at positions between the plurality of wires that constitute the first wire group 35, and the respective wires 35 that constitute the first wire group 34 and the respective wires 35 that constitute the second wire group 39 contact each other in the axial direction. Thus, the shortest distance between the high-pressure-side edges of the respective wires 35 that constitute the first wire group 34 and the low-pressure-side edges of the respective wire 35 that constitute the second wire group 39 can be shortened.

"Second Embodiment of Axial Seal Structure"

Figure 9:
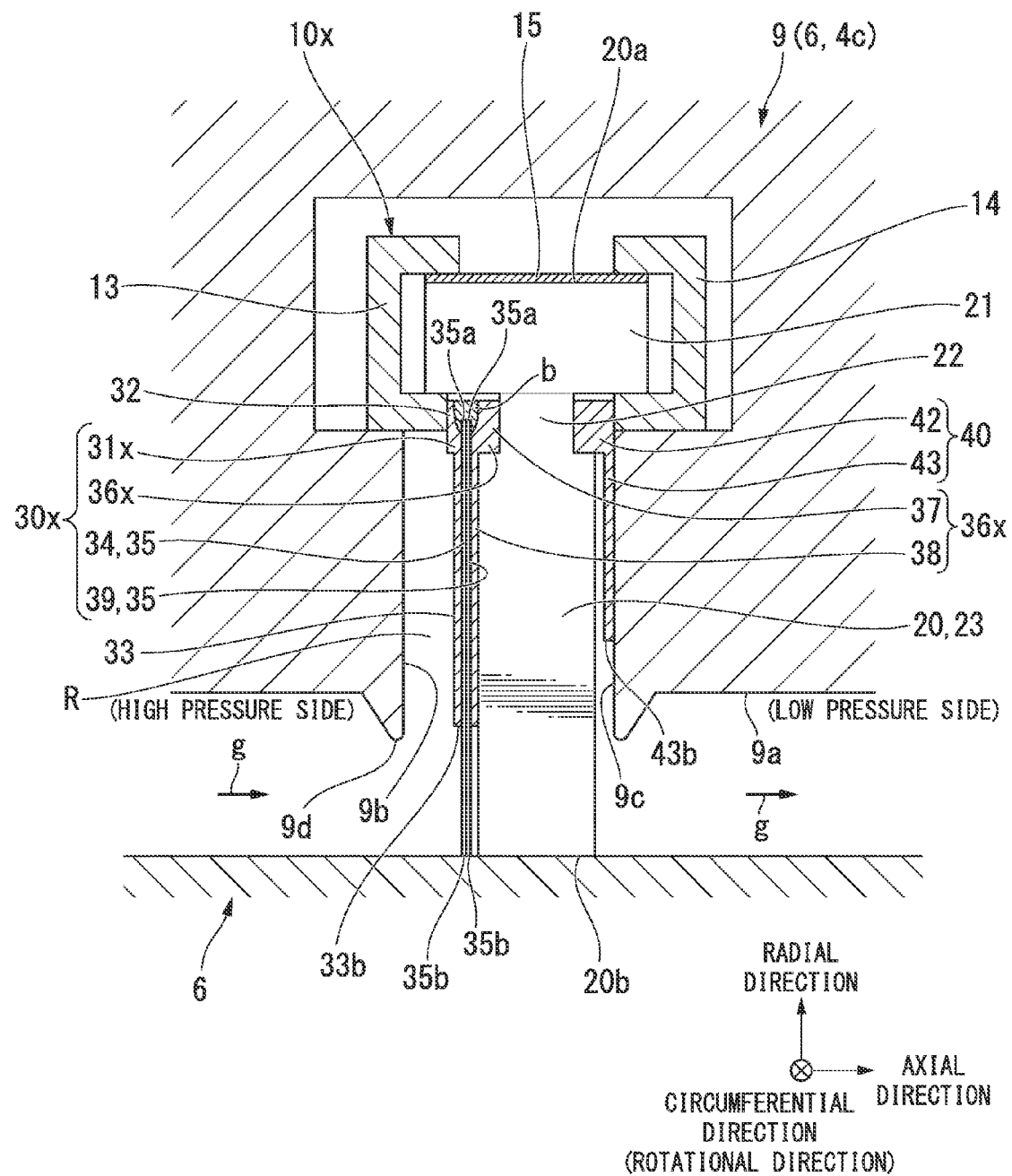
FIG. 9 is a cross-sectional view of an axial seal structure in a second embodiment related to the invention.

Next, a second embodiment of an axial seal structure related to the invention will be described with reference to FIG. 9.

An axial seal structure 10x of the present embodiment is different from the axial seal structure 10 of the first embodiment only in the configuration of a high-pressure-side regulating member, and is the same as that of the first embodiment in terms of the other configuration. Hence, the configuration of a high-pressure-side regulating member 30x will mainly be described below.

The high-pressure-side regulating member 30x of the present embodiment has the first wire group 34 and the second wire group 39 each including the multiple wires 35, and a side plate 31x, 36x to which the base ends 35a of all the wires 35 that constitute each wire group 34, 39 are brazed. As the side plates 31x and 36x, there are a first side plate 31x located on the high pressure side of the first wire group 34 and a second side plate 36x located on the low pressure side of the second wire group 39. That is, in the present embodiment, the first wire group 34 and the second wire group 39 are sandwiched by the first side plate 31x and the second side plate 36x in the axial direction.

Both the first side plate 31x and the second side plate 36x have a thickness direction facing the axial direction, are formed in the shape of a circular-arc belt as seen from the axial direction, and have base portions 32 and 37 that are formed on the outer circular-arc side of the circular-arc belt shape, and thin sheet seal piece portions 33 and 38 that are formed on the inner circular-arc side of the circular-arc belt shape. The thickness (axial dimension) of each base portion 32, 37 is set to be greater than the thickness of the thin sheet seal piece portion 33, 38. Each thin sheet seal piece portion 33, 38 extends to a position slightly outside the position of an innermost peripheral edge 9d of the casing 9, radially inward from the corresponding base portion 32, 37. In other words, the distance from the outer peripheral surface of the rotating shaft 6 to a radial inner end 33b of the thin sheet seal piece portion 33, 38 is longer than the distance from the outer peripheral surface of the rotating shaft 6 to the innermost peripheral surface 9d of the casing 9.

The base portion 32 of the first side plate 31x covers the high pressure side and radial outside of the base ends 35a of all the wires 35 that constitute the first wire group 34. Additionally, the base portion 37 of the second side plate 36x covers the low pressure side and radial outside of the base ends 35a of all the wires 35 that constitute the second wire group 39. The base portion 37 of the second side plate 36x protrudes to the low pressure side with respect to the thin sheet seal piece portion 38 of the second side plate 36x, and enters a high-pressure-side recess between the heads 21 and the trunks 23 of the thin sheet seal pieces 20.

The base ends 35a of all the wires 35 that constitute the first wire group 34 and the base ends 35a of all the wires 35 that constitute the second wire group 39 are brazed to the base portions 32 and 37 of the side plates 31x and 36x, and are coupled together. This brazing joins the base portion 32 of the first side plate 31x and the base portion 37 of the second side plate 36x.

As described above, in the present embodiment, the thin sheet seal piece portions 33 and 38 are provided on the high pressure side of the respective wires 35 of the first wire group 34 and the low pressure side of the second wire group 39. Therefore, the amount of the working fluid g, which enters the minute gaps s between the respective thin sheet seal pieces 20 from a radial outer position through the high-pressure-side regulating member 30x, becomes substantially 0. Hence, in the present embodiment, reduction in the floating force of the respective thin sheet seal pieces 20 can be suppressed, and the floating force for the respective thin sheet seal pieces 20 can be secured more than that in the first embodiment.

In addition, in the present embodiment, only the base portions of the wires 35 are brazed to the base portions 32 and 37 of the side plates 31x and 36x. However, the wires 35 may be brazed even to the thin sheet seal piece portions 33 and 38. However, if the wires 35 are brazed even to the thin sheet seal piece portions 33 and 38, the brazed portions are formed integrally with the thin sheet seal piece portions 33 and 38, and are not elastically deformed independently as the wires 35. Therefore, the configuration in which only the base portions of the wires 35 are brazed like the present embodiment is preferable.

Additionally, in the present embodiment, the side plates 31x and 36x are respectively arranged on the high pressure side of the first wire group 34 and on the low pressure side of the second wire group 39. However, even if a side plate is arranged only on at least one side, the same effects can be basically obtained.

Additionally, in the above embodiments, the two wire groups of the first wire group and the second wire group are densely arranged in the axial direction. However, one wire group may be arranged or three or more wire groups may be arranged.

Additionally, the case where the axial seal structure 10, 10x is applied to the gas turbine 4 has been described above. However, the axial seal structure of the invention is not limited to this. For example, it is needless to say that the invention can also be applied to various rotation mechanisms, such as steam turbines, compressors, water wheels, refrigerators, and pumps.

Industrial Applicability

According to the axial seal structure related to the aspect of the invention, the floating force for the respective multiple thin sheet seal pieces can be sufficiently secured, while avoiding damage to the high-pressure-side regulating device by vibration or eccentric rotation of the rotating shaft.

REFERENCE SIGNS LIST

- 2: COMPRESSOR
- 2a, 4a: ROTOR
- 2b, 4b, 9: CASING
- 3: COMBUSTOR
- 4: GAS TURBINE
- 5, 5c: ANNULAR STATOR VANE GROUP
- 6, 6c: ROTATING SHAFT
- 7, 7c: ANNULAR MOVABLE VANE GROUP
- 10, 10x: AXIAL SEAL STRUCTURE
- 11: SEAL SEGMENT
- 20: THIN SHEET SEAL PIECE
- 20a: RADIAL OUTER END (OF THIN SHEET SEAL PIECE)
- 20b: RADIAL INNER END (OF THIN SHEET SEAL PIECE)
- 30, 30x: HIGH-PRESSURE-SIDE REGULATING MEMBER
  - 31: WIRE BASE
  - 31x, 36x: SIDE PLATE
  - 35: WIRE
  - 35a: BASE END (OF WIRE)
  - 35b: TIP (OF WIRE)
  - 34: FIRST WIRE GROUP
  - 39: SECOND WIRE GROUP
  - 40: LOW-PRESSURE-SIDE REGULATING MEMBER (LOW-PRESSURE-SIDE SIDE SEAL PLATE)

The invention claimed is:

1. An axial seal structure in which multiple thin sheet seal pieces are arranged within an annular space between an outer peripheral surface of a rotating shaft and a casing surrounding a periphery of the rotating shaft with a minute gap between each of the multiple thin sheet seal pieces in a circumferential direction of the rotating shaft such that respective thickness directions of the multiple thin sheet seal pieces are directed towards the circumferential direction of the rotating shaft, radial inner ends of the multiple thin sheet seal pieces are free ends, and radial outer ends of the multiple thin sheet seal pieces are coupled together and divide the annular space into a high-pressure-side region and a low-pressure-side region in an axial direction of the rotating shaft, the axial seal structure comprising:

a high-pressure-side regulating device that is arranged within the annular space and configured to regulate the flow of a fluid from the high-pressure-side region to the multiple thin sheet seal pieces along a high pressure side of the multiple thin sheet seal pieces and along the outer peripheral surface of the rotating shaft, wherein the high-pressure-side regulating device has multiple wires that are flexible and densely arranged in the circumferential direction of the rotating shaft, wherein respective longitudinal directions of the multiple wires face a direction having a radial component of the rotating shaft, wherein tips that are respective radial inner ends of the multiple wires are free ends, and are in close proximity to or in contact with the outer peripheral surface of the rotating shaft, wherein base ends that are respective radial outer ends of the multiple wires are coupled together and sandwiched between a wire base formed from two plates, the wire base being fitted to a high-pressure-side recess of each of the multiple thin sheet seal pieces, and wherein the base ends of the multiple wires are coupled together such that adjacent ones of the multiple wires in the circumferential direction are in contact with each other at least partially in the longitudinal directions.

2. The axial seal structure according to claim 1,
   wherein the high-pressure-side regulating device has a plurality of wire groups that is densely arranged in the axial direction of the rotating shaft, and
   wherein each of the plurality of wire groups has the multiple wires that are densely arranged in the circumferential direction of the rotating shaft.

3. The axial seal structure according to claim 2,
   wherein the multiple wires are respectively provided in an inclined manner such that the tips are located on a rotational direction side of the rotating shaft with respect to the base ends.

4. The axial seal structure according to claim 3,
   wherein the multiple thin sheet seal pieces are respectively provided in an inclined manner such that the radial inner ends are located on the rotational direction side of the rotating shaft with respect to the radial outer ends, and
   wherein an inclination amount of the multiple wires is different from an inclination amount of the multiple thin sheet seal pieces.

5. The axial seal structure according to claim 4,
   wherein the high-pressure-side regulating device has a thickness direction facing the axial direction of the rotating shaft, forms a circular-arc belt shape in an axial cross section, and has a side plate that is in close proximity to or in contact with a high pressure side and/or a low pressure side of the multiple wires on a base end side of the multiple wires, and
   wherein a radial inner end of the side plate is located radially outside a radial inner edge of the casing.

6. The axial seal structure according to claim 5,
   wherein the respective base ends of the multiple wires and the respective radial outer ends of the side plate are joined together, and the wires are not joined to a portion of the side plate radially inside the radial outer ends.

7. The axial seal structure according to claim 3,
   wherein the high-pressure-side regulating device has a thickness direction facing the axial direction of the rotating shaft, forms a circular-arc belt shape in an axial cross section, and has a side plate that is in close proximity to or in contact with a high pressure side and/or a low pressure side of the multiple wires on a base end side of the multiple wires, and
   wherein a radial inner end of the side plate is located radially outside a radial inner edge of the casing.

8. The axial seal structure according to claim 7,
   wherein the respective base ends of the multiple wires and the respective radial outer ends of the side plate are joined together, and the wires are not joined to a portion of the side plate radially inside the radial outer ends.

9. The axial seal structure according to claim 2,
wherein the high-pressure-side regulating device has a thickness direction facing the axial direction of the rotating shaft, forms a circular-arc belt shape in an axial cross section, and has a side plate that is in close proximity to or in contact with a high pressure side and/or a low pressure side of the multiple wires on a base end side of the multiple wires, and
wherein a radial inner end of the side plate is located radially outside a radial inner edge of the casing.

10. The axial seal structure according to claim 9,
wherein the respective base ends of the multiple wires and the respective radial outer ends of the side plate are joined together, and the wires are not joined to a portion of the side plate radially inside the radial outer ends.

11. The axial seal structure according to claim 1,
wherein the multiple wires are respectively provided in an inclined manner such that the tips are located on a rotational direction side of the rotating shaft with respect to the base ends.

12. The axial seal structure according to claim 11,
wherein the multiple thin sheet seal pieces are respectively provided in an inclined manner such that the radial inner ends are located on the rotational direction side of the rotating shaft with respect to the radial outer ends, and
wherein an inclination amount of the multiple wires is different from an inclination amount of the multiple thin sheet seal pieces.

13. The axial seal structure according to claim 12,
wherein the high-pressure-side regulating device has a thickness direction facing the axial direction of the rotating shaft, forms a circular-arc belt shape in an axial cross section, and has a side plate that is in close proximity to or in contact with a high pressure side and/or a low pressure side of the multiple wires on a base end side of the multiple wires, and
wherein a radial inner end of the side plate is located radially outside a radial inner edge of the casing.

14. The axial seal structure according to claim 13,
wherein the respective base ends of the multiple wires and the respective radial outer ends of the side plate are joined together, and the wires are not joined to a portion of the side plate radially inside the radial outer ends.

15. The axial seal structure according to claim 11,
wherein the high-pressure-side regulating device has a thickness direction facing the axial direction of the rotating shaft, forms a circular-arc belt shape in an axial cross section, and has a side plate that is in close proximity to or in contact with a high pressure side and/or a low pressure side of the multiple wires on a base end side of the multiple wires, and
wherein a radial inner end of the side plate is located radially outside a radial inner edge of the casing.

16. The axial seal structure according to claim 15,
wherein the respective base ends of the multiple wires and the respective radial outer ends of the side plate are joined together, and the wires are not joined to a portion of the side plate radially inside the radial outer ends.

17. The axial seal structure according to claim 1,
wherein the high-pressure-side regulating device has a thickness direction facing the axial direction of the rotating shaft, forms a circular-arc belt shape in an axial cross section, and has a side plate that is in close proximity to or in contact with a high pressure side and/or a low pressure side of the multiple wires on a base end side of the multiple wires, and
wherein a radial inner end of the side plate is located radially outside a radial inner edge of the casing.

18. The axial seal structure according to claim 17,
wherein the respective base ends of the multiple wires and the respective radial outer ends of the side plate are joined together, and the wires are not joined to a portion of the side plate radially inside the radial outer ends.

19. A rotation mechanism comprising:
the axial seal structure, the rotating shaft, and the casing according to claim 1.

20. A rotation mechanism comprising:
the axial seal structure, the rotating shaft, and the casing according to claim 2.

* * * * *